United States Patent [19]

Buckner et al.

[11] Patent Number: 4,890,269

[45] Date of Patent: Dec. 26, 1989

[54] HELIOCHRON

[76] Inventors: Robert Buckner, 6423 Coral Lake Ave., San Diego, Calif. 92119; Mae Morris, 5363 Burford St., San Diego, Calif. 92111

[21] Appl. No.: 390,294

[22] Filed: Aug. 7, 1989

[51] Int. Cl.[4] ........................ G04B 19/26; G01C 17/34

[52] U.S. Cl. ........................................ 368/15; 33/270

[58] Field of Search .................................... 368/15–17, 368/223, 228, 79, 239; 33/207, 268, 270–271

[56] References Cited

U.S. PATENT DOCUMENTS

| | | | |
|---|---|---|---|
| 2,963,790 | 12/1960 | Hall | 33/270 |
| 3,786,570 | 1/1974 | Davies | 33/270 |
| 4,034,549 | 7/1977 | Danley et al. | 368/234 |
| 4,237,611 | 12/1980 | Wurch et al. | 33/270 |
| 4,255,864 | 3/1981 | Glendinning | 33/270 |
| 4,645,354 | 2/1987 | Mercer | 368/15 |
| 4,656,748 | 4/1987 | Thual | 33/270 |

*Primary Examiner*—Vit W. Miska
*Attorney, Agent, or Firm*—Charles C. Logan, II

[57] ABSTRACT

A helichron having a box-like housing to which a cover is pivotally hinged. A magnetic compass is positioned in the box-like housing at a predetermined directional orientation. A 360 degree spirit level is also positioned within the box-like housing. The top surface of the cover has an hour scale recess having a semi-circular wall portion and a planar surface portion. An Arabic numbers hour scale is imprinted on the semi-circular wall to denote hours for the northern hemisphere and a Roman numeral hour scale is imprinted on the horizontal planar surface to denote hours for the southern hemisphere. There is a gnomon and structure for mounting its bottom end in the horizontal planar surface of the hour scale recess. There is also a latitude scale member attached to the bottom surface of the cover whose index is set to the users latitude by varying the angle of the cover.

3 Claims, 1 Drawing Sheet

HELIOCHRON

BACKGROUND OF THE INVENTION

The invention relates to a device for telling time by using the sun and more specifically to a heliochron in the form of a personal sundial that can be carried from place to place by the user.

Sundials have been in use for hundreds of years. Most of them are large and cumbersome and are not designed to be carried around by the user. Also, most sundials are designed to only function either in the northern hemisphere or southern hemisphere and are designed for use in pre-determined latitudes.

It is an object of the invention to provide a novel heliochron that is pocket sized so it may be carried in a persons pocket or bag.

It is also an object of the invention to provide a novel heliochron that can be used in both the northern and southern hemispheres to accurately determine the time of day.

It is another object of the invention to provide a novel heliochron that has a latitude scale structure that adjusts the angle of the top surface of the cover so that it may be coordinated with the latitude at which the user is located.

It is an additional object of the invention to provide a novel heliochron that is economical to manufacture and market.

It is a further object of the invention to provide a novel heliochron that is easily used by its user.

SUMMARY OF THE INVENTION

Applicant's novel heliochron is a pocket sized solar time piece that becomes an equatorial sundial when the lid is open and the gnomon is inserted into its functional position. It can be adjusted to any latitude and used in both the northern and southern hemispheres.

The heliochron has a box-like housing and a cover that are hinged together adjacent their rear walls. A magnetic compass is positoned in the chamber formed in the box-like housing at a predetermined directional orientation. A 360 degree spirit level is also positioned within the box-like housing. A latitude adjustment arm has its bottom end pivotally secured in the box-like housing and an index member extending laterally from its top end travels in a longitudinally extending slot formed in a latitude scale member that is secured to the bottom surface of the cover. A wire gnomon is stored in the box-like chamber when not in use. The top surface of the cover has an hour scale recess formed therein that has a semi-circular wall portion and a planar surface portion. A recess or hole is formed at a predetermined location on the planar surface for receiving the bottom end of the gnomon. The semi-circular wall has an Arabic hour scale imprinted thereon to denote the hours for the northern hemisphere. A Roman numeral hour scale is imprinted on the horizontal surface to denote hours for the southern hemisphere.

The compass is permanently oriented so that the wire gnomon, when in place is parallel with the plane of the north at zero degrees (0 degrees) and south (180 degrees) markings on the compass face. The latitude adjustment arm and the compass are used to equatorally align the heliochron to the users location. Equatorial alignment gives the most accurate time and means the gnomon is parallel with the earths axis of rotation (pointing to the celestial pole) and is at right angles to the plane of the earth's equator. Equatorial orientation is automatic when the heliocron is: (a) adjusted to the users latitude; (b) held level; and (c) turned to make the compass needle point to the magnetic declination of the users location. Latitude is the number of degrees the location is north (+) or south (−) of the equator. Magnetic declination is the number of degrees the compass needle points east or west of the geographic pole. If not already known, the user may obtain the necessary latitude and magnetic declination values from the local library or airport.

To use the heliochron, turn the ring of the compass bezel to point its arrow to your magnetic deviation. Use the degree marking on the compass face as one's guide. Next insert the gnomon in the aperture formed on the planar horizontal surface of the hour scale recess. Following this, one would set the index of their latitude by adjusting the angle of the lid. Then the user would face his geographic pole and turn the heliochron so the compass needle is exactly aligned under the arrow. At this point the heliochron should be held level and steady. The time is read as shown by the gnoman's shadow on the dial. The Arabic numbers are for the northern hemisphere and the Roman numerals are for the southern hemisphere. Remember, sundial time is different than clock time.

Sundial time versus clock time will now be discussed. Sundial time is called local apparent time (LAT) and for reasons relating to the earths orbital motion around the sun, the length of sucessive sundial days progressively vary throughout the year. Some are a little more than 24 hours long and some are a little less, but the variations average out to a mean solar day of 24 hours, and it is called local mean time (LMT). Both sundial time and a clock set to local mean time give the correct time only for the longitude on which they are used. If they both are on the same longitude the sundial could be up to 16 minutes faster or fourteen minutes slower than the clock. The daily time difference between the two is called the equation of time. A chart showing these daily values is included with the heliocron. It is necessary to add or subtract the value for a given day to sundial time to get local mean clock time.

DESCRIPTION OF THE PREFERRED EMBODIMENT

Figure 1:
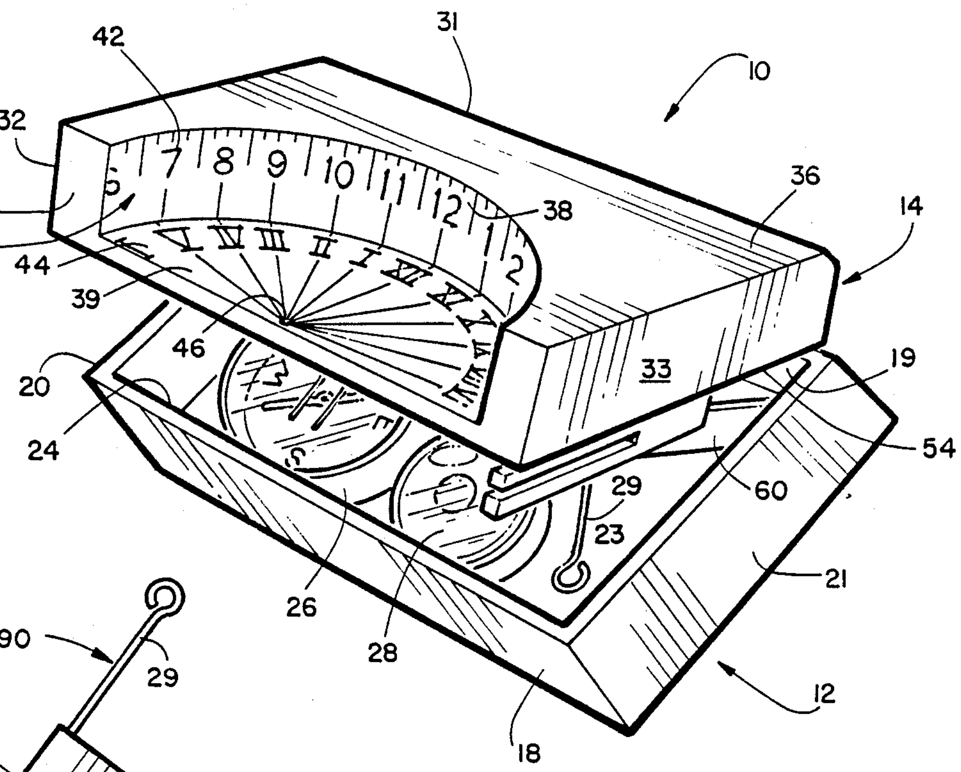
FIG. 1 is a front perspective view of appplicant's novel heliochron.

Applicant's novel heliochron will now be described by referring to FIGS. 1–4 of the drawing. The heliochron is generally designated numeral 10.

Heliochron 10 has a box-like housing 12 and a cover 14. They are pivotally connected to each other by hinge assembly 16.

Box-like housing 12 has a front wall 18, a rear wall 19, and laterally spaced side walls 20 and 21. It also has a bottom wall 23 and together the structure forms a chamber 24. A magnetic compass 26 is rigidly secured in a predetermined aligned position in chamber 24. A 360 degree spirit level 28 is also fixedly secured to the top surface of bottom wall 23. Wire gnomon 29 is stored in chamber 24 when not in use.

Cover 14 has a front wall 30, a rear wall 31 and laterally spaced side walls 32 and 33. An hour scale recess 35 is formed in top wall 36 and front wall 30. Hour scale recess 35 has a semi-circular wall 38 and a planar surface portion 39. An Arabic number scale 42 is imprinted on semi-circular wall 38 and a Roman numeral scale 34 is imprinted on planar surface portion 39. A recess or hole 46 is formed in planar surface portion 39 at a predetermined position for receiving the bottom end of gnomon 29 when used as a sundial.

Figure 2:
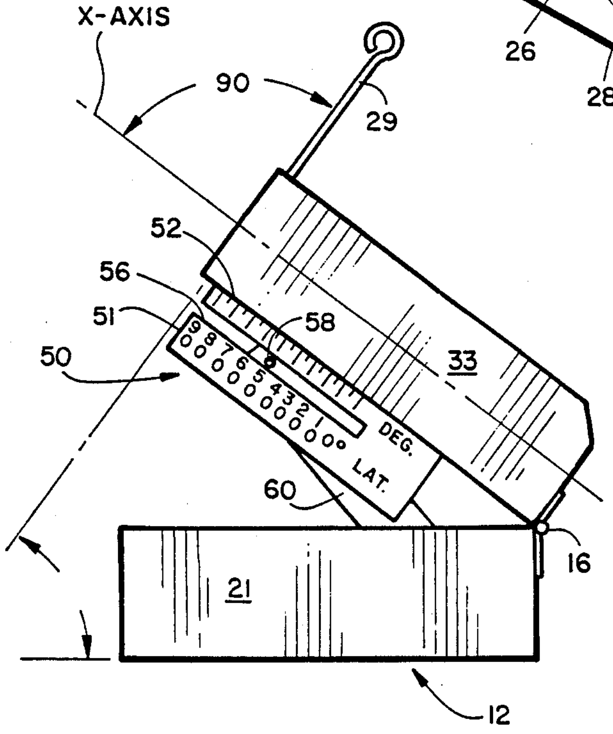
FIG. 2 is a side elevation view of the heliochron in its open position.

An elongated latitude scale member 50 has a front edge 51 and a top edge 52. The top edge 52 of latitude scale member 50 is secured to the bottom wall 54 of cover 14. It has a longitudinally extending slot 56 in it. An index member 58 is captured within slot 56 and slides axially there along as the cover 14 is raised and lowered. A latitude degree scale is imprinted on the front surface of latitude scale member 50. In FIG. 2 it is noted that the latitude angle A can be identified by the position of the index member along the latitude degree scale. It is also noted that the axis of the gnomon 29 is perpendicular to the x-axis that is representative of the equatorial plane.

Figure 4:
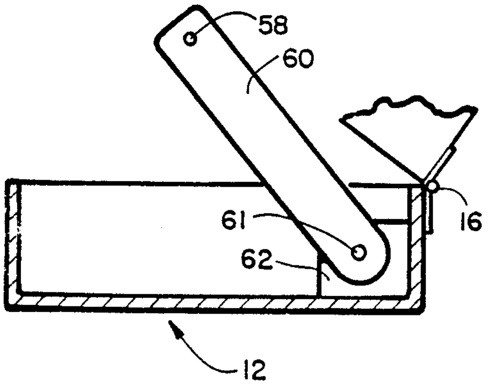
FIG. 4 is a cross sectional view taken through the box-like housing.
Figure 3:
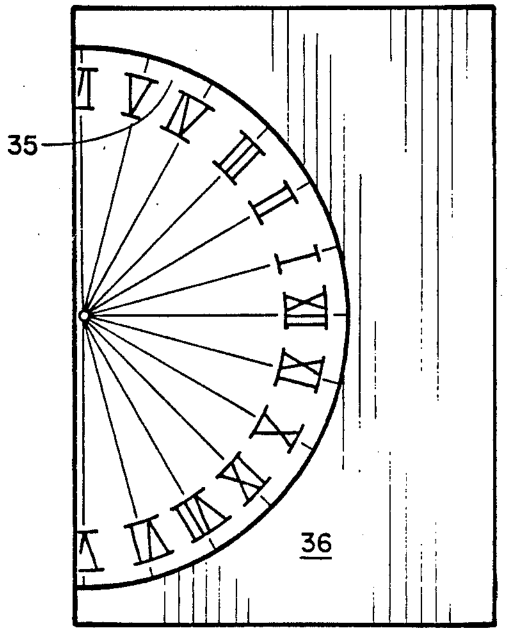
FIG. 3 is a top plan view of the heliochron.

In FIG. 4, latitude adjustment arm 60 is shown with its bottom end being pivotally mounted on a pin 61 that is secured to mounting block 62. The top end of latitude adjustment arm 60 supports the laterally extending sliding index member 58.

What is claimed is:

1. A heliochron comprising:

a box-like housing having a bottom wall, a front wall, a rear wall, and laterally spaced side walls, an open top chamber formed in said housing;

a cover having a top wall and a bottom wall;

hinge means securing said cover to said box-like housing;

an elongated latitude scale member having a top edge and a front surface, said top edge being secured to the bottom surface of said cover, a latitude scale imprinted on said front surface, a longitudinally extending slot in said latitude scale member;

an elongated latitude adjustment arm having a front end and a rear end, an index member mounted in said latitude adjustment arm adjacent its front end and extending laterally thereto and received in the slot in said latitude scale member;

means for pivotally securing the rear end of said latitude adjustment arm to the interior of said box-like housing;

an hour scale recess formed in the top wall of said cover, said recess having a vertical semi-circular wall and a horizontal planar surface, an hour scale imprinted on said semi-circular wall to denote hours for the northern hemisphere, an hour scale imprinted on said horizontal planar surface to denote hours for the southern hemisphere;

an elongated gnomon having a top end and a bottom end; and means for detachably mounting the bottom end of said gnomon at a predetermined point in the horizontal planar surface of said hour scale recess so said gnomon will be at 90 degrees to said planar surface.

2. A heliochron as recited in claim 1 further comprising a magnetic compass positioned in said chamber at a predetermined directional orientation.

3. A heliochron as recited in claim 1 further comprising a 360 degree spirit level positioned in said chamber.

* * * * *